(12) United States Patent
Brooksby et al.

(10) Patent No.: US 6,753,876 B2
(45) Date of Patent: Jun. 22, 2004

(54) METHOD FOR HIGH DYNAMIC RANGE IMAGE CONSTRUCTION BASED ON MULTIPLE IMAGES WITH MULTIPLE ILLUMINATION INTENSITIES

(75) Inventors: Glen William Brooksby, Glenville, NY (US); Joseph Leagrand Mundy, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,409

(22) Filed: Dec. 21, 2001

(65) Prior Publication Data

US 2003/0117412 A1 Jun. 26, 2003

(51) Int. Cl.$^7$ ................................................. G09G 5/10
(52) U.S. Cl. ........................................ 345/589; 345/440
(58) Field of Search ................................. 345/589, 592, 345/595, 440, 440.1

(56) References Cited

U.S. PATENT DOCUMENTS

| 5,589,942 A | | 12/1996 | Gordon ...................... 356/376 |
| 5,727,080 A | * | 3/1998 | Cox et al. ................... 382/168 |
| 5,949,918 A | * | 9/1999 | McCaffrey .................. 382/274 |
| 6,335,735 B1 | * | 1/2002 | Denda et al. ............... 345/589 |

* cited by examiner

Primary Examiner—Matthew Luu
(74) Attorney, Agent, or Firm—Jean K. Testa; Patrick K. Patnode

(57) ABSTRACT

A method for increasing the dynamic light intensity range of an image by combining pixel data from multiple images collected at different levels of illumination intensity to create a single floating-point image representation of an observed scene.

14 Claims, 1 Drawing Sheet

METHOD FOR HIGH DYNAMIC RANGE IMAGE CONSTRUCTION BASED ON MULTIPLE IMAGES WITH MULTIPLE ILLUMINATION INTENSITIES

BACKGROUND OF INVENTION

The present invention relates to a method for image processing in a non-contact gauge measurement system, and more particularly, to a method for increasing the dynamic light intensity range of an image by combining or fusing data from multiple images collected at different levels of illumination to create a single floating-point representation of an object undergoing measurement.

Photogrametric measurement systems such as laser range finders, illuminate an object undergoing measurement using structured light. Reflections of the structured light projected on the surface of the object are captured by one or more calibrated cameras, generating images comprised of pixels. These are representative of the light intensity on illuminated portions of the object's surface. In some applications, the structured light is in the form of a set of laser planes. Where the laser planes intersect the surface of the object, a striping effect is achieved. By detecting these laser light stripes in the images of the object's surface, point correspondences can be established and triangulation techniques employed to digitally reconstruct a three-dimensional representation of the surface of the object.

The surface of many objects include regions which are shiny or dull, or otherwise have poor reflectivity characteristics. Structured light projected onto these surfaces can result in a high range of dynamic light intensity levels, i.e. dull spots and overly bright spots. This results in poor laser stripe identification in the resulting images obtained by the cameras. Furthermore, in some situations, entire image regions which are representative of portions of an object's surface may become corrupted due to under exposure, i.e. the region appears black, or saturation, i.e. the region appears white.

When using photogrametric methods to identify or measure objects in an image, the accuracy with which a salient feature in the image is located is negatively impacted by pixel saturation or pixel noise. Therefore, to view a scene which has a high dynamic range of illumination intensity, i.e. from dark to light, inexpensive low dynamic range cameras often prove inadequate. But, in some applications, the use of expensive, high dynamic range cameras is not possible.

Accordingly, there is a need in the industry for a method of utilizing lower performance and lower cost cameras, having lower dynamic light ranges, to provide high dynamic light range images.

SUMMARY OF INVENTION

Briefly stated, the present invention provides a method for increasing the dynamic light intensity range of an image by fusing pixel data from multiple images collected at different levels of illumination to create a single floating-point image representation of an object undergoing measurement.

In one embodiment, the present invention provides a method of establishing the location of features in an image by preventing illumination saturation of individual pixels comprising the image. In another embodiment, the present invention extends the dynamic illumination range of an imaging system by generating a high dynamic illumination range floating-point representation of the image.

The foregoing and other objects, features, and advantages of the invention as well as the presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In a first embodiment of the present invention, an image composed of a set of pixels is obtained from a camera or imaging sensor viewing a scene; for example, an object undergoing non-contact measurement. Each pixel is represented by a set of coordinates (X,Y), identifying the location of the pixel in the image, and a value (Z) representing the level of light intensity at that location. Each pixel thus provides a record of the level of light intensity or illumination at that particular location in the image. The light intensity is initially recorded as an integer value and proportionally ranges from 0 to an upper limit, such as 127 or 255. Pixels having a light intensity value of 0, herein referred to as "dark pixels" represent points in an image where the light intensity observed by the camera is below a minimum detectable threshold or noise floor. Correspondingly, pixels having a light intensity value at the upper limit, herein referred to as "saturated pixels" represent points in the image where the light intensity observed by the camera is at or above a maximum detectable threshold. Pixels having light intensity values between the lower limit and upper limits are herein referred to as "illuminated pixels". When the illumination intensity range at the camera exceeds the dynamic range of integer values used to represent the light level for each pixel, information is lost as the pixel is either saturated, or falls below the noise floor of the camera.

Light intensity levels recorded for individual pixels in a camera observing an illuminated object are affected by the illumination on the object and the period of the camera observes the object. In one embodiment, multiple images of the same scene including the object are obtained at different levels of object illumination. Each separate image is registered so that a pixel in any of the images always represents the same point in the scene.

Figure 1:
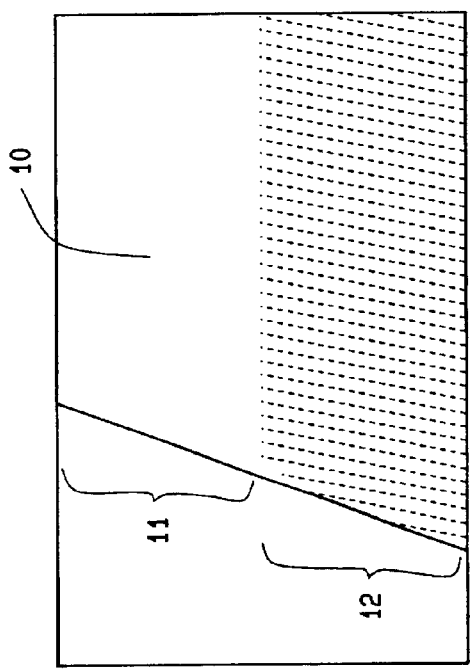
FIG. 1 is an image of laser stripes of a low intensity projected onto the surface of an object having both shiny and dull regions.
Figure 2:
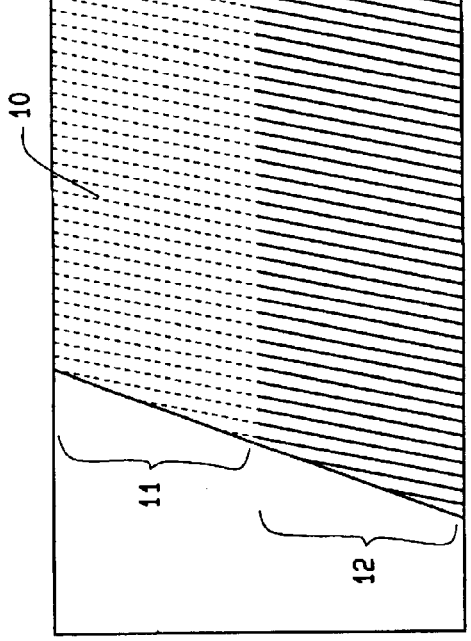
FIG. 2 is an image of laser stripes of a medium intensity projected onto the object of FIG. 1.
Figure 3:
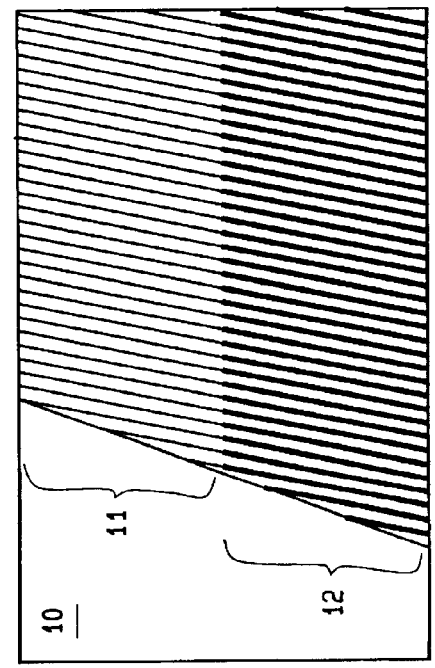
FIG. 3 is an image of laser stripes of a high intensity projected onto the object of FIG. 1.

Turning next to FIGS. 1–3, a sequence of images of a portion of an object 10 are shown. As seen in FIG. 1, the object 10 having a shiny or reflective region 11 and an adjacent dull region 12 is illuminated by a series of laser stripes 14 at a low illumination intensity. At the low illumination intensity, only laser light reflected diffusely from the dull region 12 is observed by the camera. Light reflected from the shiny region 11 undergoes a specular reflection and is not seen by the camera. It therefore falls below the pixel noise floor, and is not registered. In FIG. 2, the same scene is again imaged, with the laser stripes 14 now projected at a second, higher illumination intensity. At the second illumination intensity, some laser light reflected from the shiny region 11 is received by the camera, resulting in illuminated pixels, while other pixels remain dark. Laser light reflected from the dull region 12 is correspondingly increased. Finally, as seen in FIG. 3, the same scene is imaged with the laser stripes 14 projected at a third, yet higher illumination intensity. Again, some laser light reflected from the shiny region 11 is received, resulting in illuminated pixels, but the diffuse reflections from duller regions 12 of the object 10 are now so large as to result in saturated pixels.

Those of ordinary skill in the art will recognize that any number of images may be obtained, at any number of unique light illumination levels or at light illumination levels which differ from the initial illumination level. These levels may be higher or lower than the initial illumination level, adjusted through control of the illumination light source, as is required to yield a set of images wherein no pixel representing an object feature is either dark or saturated. Alternatively, those of ordinary skill in the art will recognize that sensor or camera shutter speed, whether mechanically or electronically controlled, sensor integration time, and aperture settings may be adjusted, along with other similarly known techniques to control the amount of light recorded in an image.

An illumination scale factor between each image is calculated, or is known a-priori. The scale factor is now used to map light illumination intensity levels in one image of the object to corresponding light illumination intensity levels in a brighter or darker image of the object.

Figure 4:
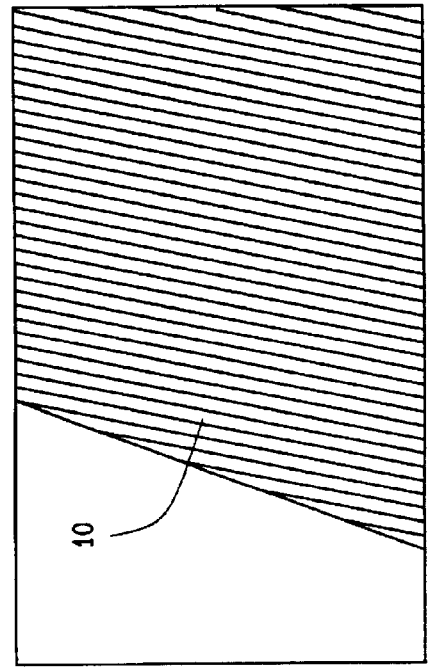
FIG. 4 is a reconstructed image of the laser stripe centers projected onto the surface of the object in FIG. 1, obtained by combining results from the images shown in FIGS. 1–3.

Each pixel in a selected image is examined to identify pixels which are saturated or dark. For each saturated pixel, the pixel light intensity value is replaced by a value taken from a corresponding illuminated pixel in an image acquired with scaled lower illumination levels. For dark pixels, the pixel light intensity value is replaced by a taken from a corresponding illuminated pixel in an image acquired at a scaled higher illumination level. Application of the appropriate scale factor to a pixel intensity integer value results in a floating-point illumination intensity value. Accordingly, in this manner, a selected image is modified to include floating-point light illumination intensity values for each individual illuminated pixel. As a result, a composite image, such as is shown in FIG. 4, is obtained having no pixels illuminated by a laser stripe 14 which are either dark or saturated.

Alternatively, a composite image is constructed from the set of registered images with each pixel in the composite image being an illuminated pixel extracted from one of the images within the set. An illumination level for the composite image is now selected, and a scale factor associated with each pixel within the composite image is utilized to scale the associated pixel intensity values accordingly. This method generates a floating-point light illumination intensity value for each pixel in the composite image.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for generating an image having an expanded illumination range of an observed scene, comprising:

obtaining a first image of said observed scene at a first illumination level;

obtaining one or more additional images of said observed scene, each said additional image being taken at an associated unique illumination level;

registering said first image and said one or more additional images;

identifying at least one of either a dark region or a saturated region in said first image;

replacing said identified dark region in said first image with information extracted from a corresponding illuminated region in said one or more additional images; and replacing said identified saturated region in said first image with information extracted from a corresponding unsaturated region in said one or more additional images.

2. The method of claim 1 further comprising scaling each said unique illumination level for each of said replaced regions to said first illumination level.

3. The method of claim 1 wherein illumination levels within said first image are represented by floating-point values.

4. A method for generating an image having an expanded illumination range of an observed scene, comprising:

obtaining a first image of said observed scene at a first illumination level, said first image composed of a set of pixels;

obtaining one or more additional images of said observed scene, each of which is taken at a unique illumination level scaled to said first illumination level and composed of sets of associated pixels;

registering said set of pixels comprising said first image with corresponding sets of associated pixels comprising said one or more additional images;

identifying at least one of either a dark pixel or a saturated pixel in said set of pixels comprising said first image;

for each identified dark pixel, replacing said identified dark pixel with a corresponding illuminated pixel from a set of associated pixels comprising said one or more additional images;

for each identified saturated pixel, replacing said identified saturated pixel with a corresponding illuminated pixel from a set of associated pixels comprising said one or more additional images; and applying an associated illumination scale factor to each replaced pixel in said set of pixels comprising said first image.

5. The method of claim 4 for generating an image having an expanded illumination range of an observed scene wherein the step of applying an associated illumination scale factor to each replaced pixel includes calculating a floating point illumination intensity value for each replaced pixel.

6. A method for generating an image of an observed scene composed of a set of pixels having an expanded illumination range, comprising:

obtaining a plurality of images of said observed scene, each of said plurality of images obtained at a different illumination level;

registering each of said plurality of images; and generating a composite image of said observed scene from said plurality of images, wherein each pixel within a set of pixels comprising said composite image is an illuminated pixel.

7. The method of claim 6 wherein the step of generating a composite image includes:

for each pixel within said set of pixels comprising said composite image, selecting a corresponding illuminated pixel from one of said plurality of images;

establishing an illumination level for said composite image; and for each pixel within said set of pixels comprising said composite image, scaling an illumination level associated with said pixel to said established illumination level.

8. The method of claim 6 wherein the step of generating a composite image includes the step of scaling, with an associated illumination scale factor, an illumination intensity value of one or more pixels within said set of pixels comprising said composite image.

9. The method of claim 6 wherein the step of generating a composite image includes the step of calculating a floating point illumination intensity value for one or more pixels within said set of pixels comprising said composite image.

10. A method for generating an image of an observed scene, comprising:

obtaining a first image of said observed scene, said first image having an observed illumination level;

altering, at least once, one or more parameters affecting said imaged illumination level of said observed scene;

obtaining, for each alteration of said one or more parameters, an additional image of said observed scene at an associated observed illumination level;

registering said first image and said one or more additional images;

identifying at least one of either a dark region or a saturated region in said first image;

replacing each said identified dark region in said first image with information extracted from a corresponding illuminated region in said one or more additional images; and replacing each said identified saturated region in said first image with information extracted from a corresponding illuminated region in said one or more additional images.

11. The method of claim 10 for generating an image of an observed scene wherein the step of altering, at least once, one or more parameters affecting said imaged illumination level of said observed scene includes altering the illumination of said observed scene.

12. The method of claim 10 for generating an image of an observed scene wherein the step of altering, at least once, one or more parameters affecting said imaged illumination level of said observed scene includes altering a camera setting.

13. The method of claim 10 for generating an image of an observed scene wherein the step of altering, at least once, one or more parameters affecting said imaged illumination level of said observed scene includes altering an illumination light source setting.

14. The method of claim 10 for generating an image of an observed scene wherein the step of altering, at least once, one or more parameters affecting said imaged illumination level of said observed scene includes altering an imaging sensor setting.

* * * * *